United States Patent [19]

Matyas

[11] Patent Number: 4,736,423
[45] Date of Patent: Apr. 5, 1988

[54] TECHNIQUE FOR REDUCING RSA CRYPTO VARIABLE STORAGE

[75] Inventor: Stephen M. Matyas, Kingston, N.Y.

[73] Assignee: International Business Machines Corporation, Armonk, N.Y.

[21] Appl. No.: 823,151

[22] Filed: Jan. 31, 1986

Related U.S. Application Data

[63] Continuation-in-part of Ser. No. 728,717, Apr. 30, 1985, abandoned.

[51] Int. Cl.$^4$ ............................................... H04K 9/04
[52] U.S. Cl. .......................................... 380/23; 380/25; 380/30
[58] Field of Search .............................. 380/23, 25, 30

[56] References Cited

U.S. PATENT DOCUMENTS

| | | | |
|---|---|---|---|
| 4,351,982 | 9/1982 | Miller et al. | 380/30 |
| 4,405,829 | 9/1983 | Rivest et al. | 380/30 |
| 4,408,203 | 10/1983 | Campbell | 380/23 |
| 4,423,827 | 12/1983 | Zeidler | 380/23 |
| 4,424,414 | 1/1984 | Hellman et al. | 380/30 |
| 4,438,824 | 3/1984 | Mueller-Schloer | 380/30 |
| 4,453,074 | 6/1984 | Weinstein | 380/30 |

*Primary Examiner*—Salvatore Cangialosi
*Attorney, Agent, or Firm*—Frederick D. Poag

[57] ABSTRACT

A technique for reducing RSA (Rivest, Shamir and Adleman algorithm) cryptovariable key from 1200 bits (400-bit public key, 400-bit secret key and 400-bit modulus) to 106 bits makes feasible the storage of the RSA algorithm parameters on current magnetic stripe cards used by the banking and finance industry. Of the 106 bits required, only 56 bits must be kept secret; the remaining 50 bits are nonsecret. These 106 bits are used to derive two 200-bit primes P and Q from which is computed the modulus N=PQ and two 400-bit keys PK (public key) and SK (secret key). In effect, a savings in storage is achieved at the expense of performing a precomputation to derive the modulus and keys each time the system is utilized for encryption/decryption. The 56-bit value plus the additional 50 bits of nonsecret data can be used to generate the RSA cryptovariables in systems where the RSA algorithm has been implemented. In another embodiment, a technique is provided for reducing the RSA cryptovariable storage of the public key PK and modulus from 800 bits to 260 bits. These 260 bits can be used at any later time to derive the 400-bit public key PK and 400-bit modulus N=PQ. The savings in storage is achieved by performing a precomputation each time the system is utilized for encryption/decryption.

12 Claims, 7 Drawing Sheets

FIG. 5
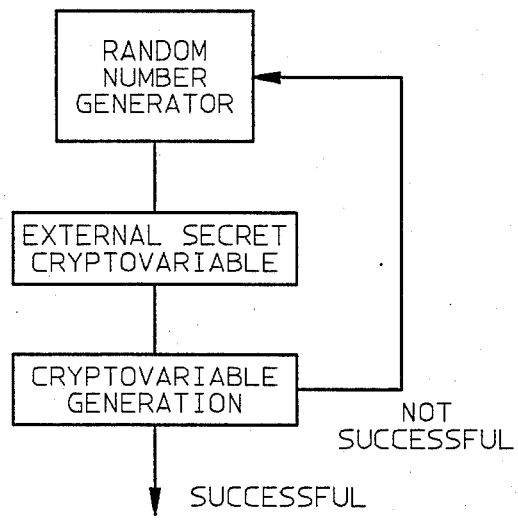
EXTERNAL CRYPTOVARIABLE ONE
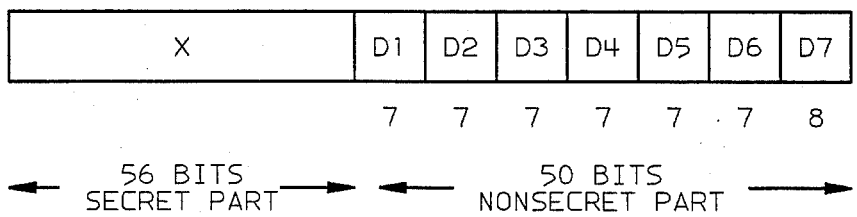
EXTERNAL CRYPTOVARIABLE TWO
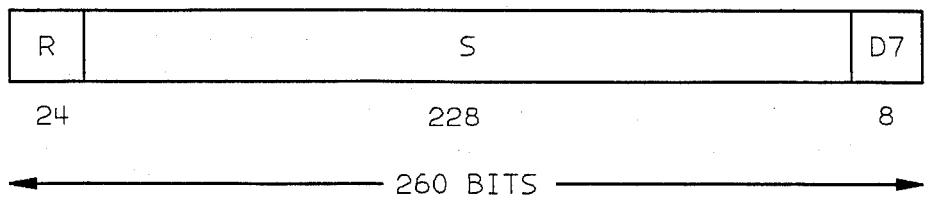

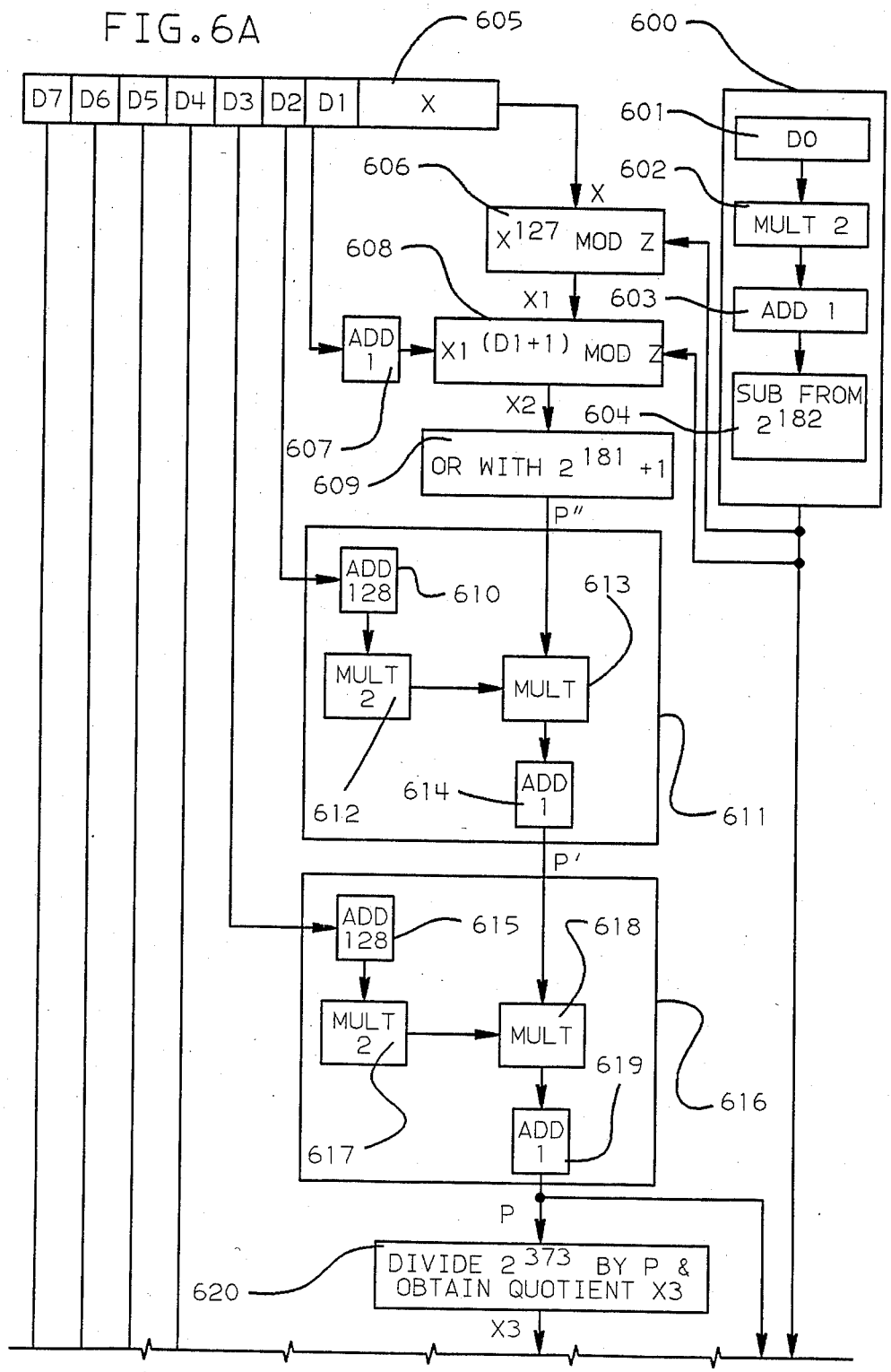

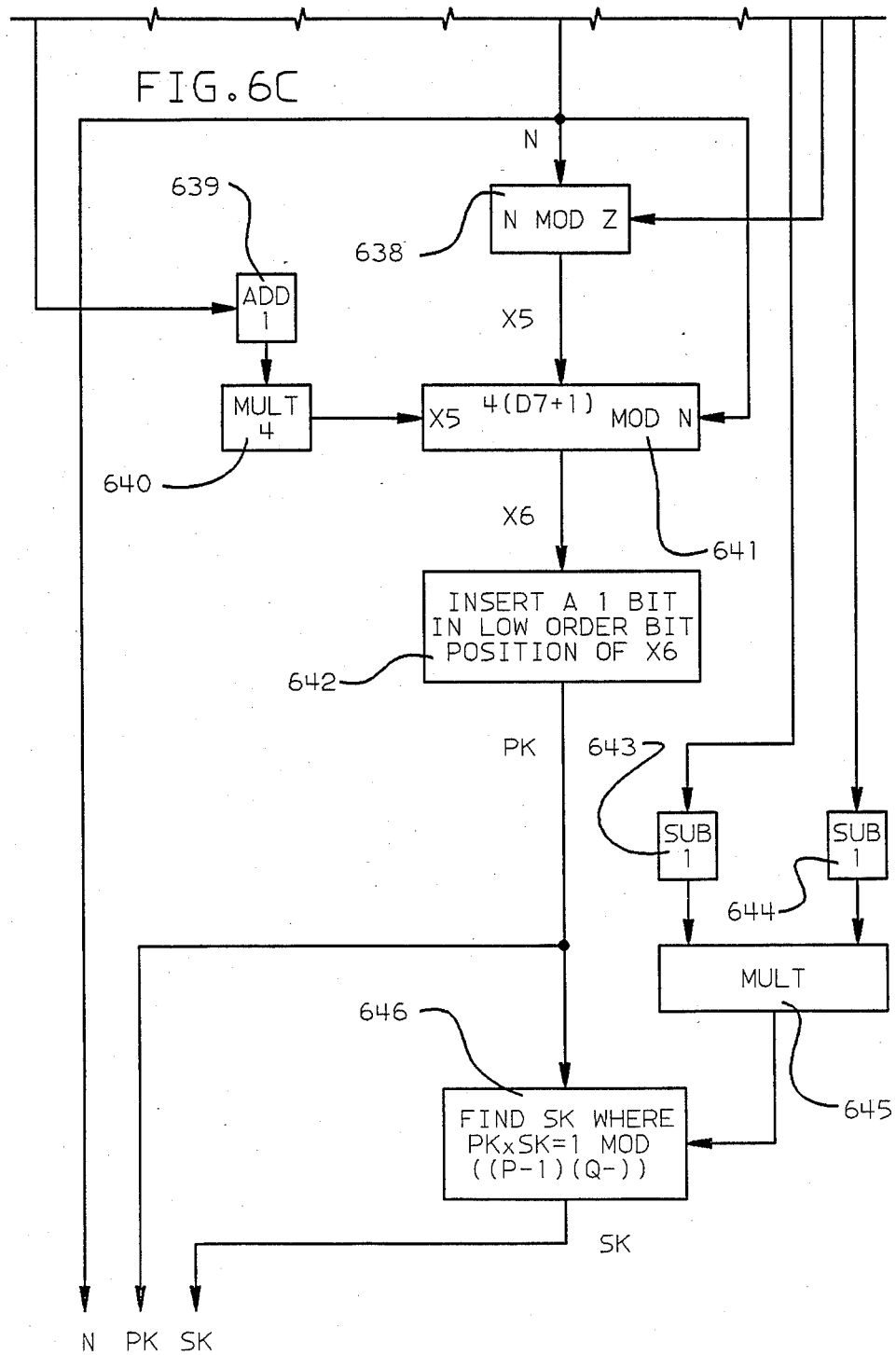

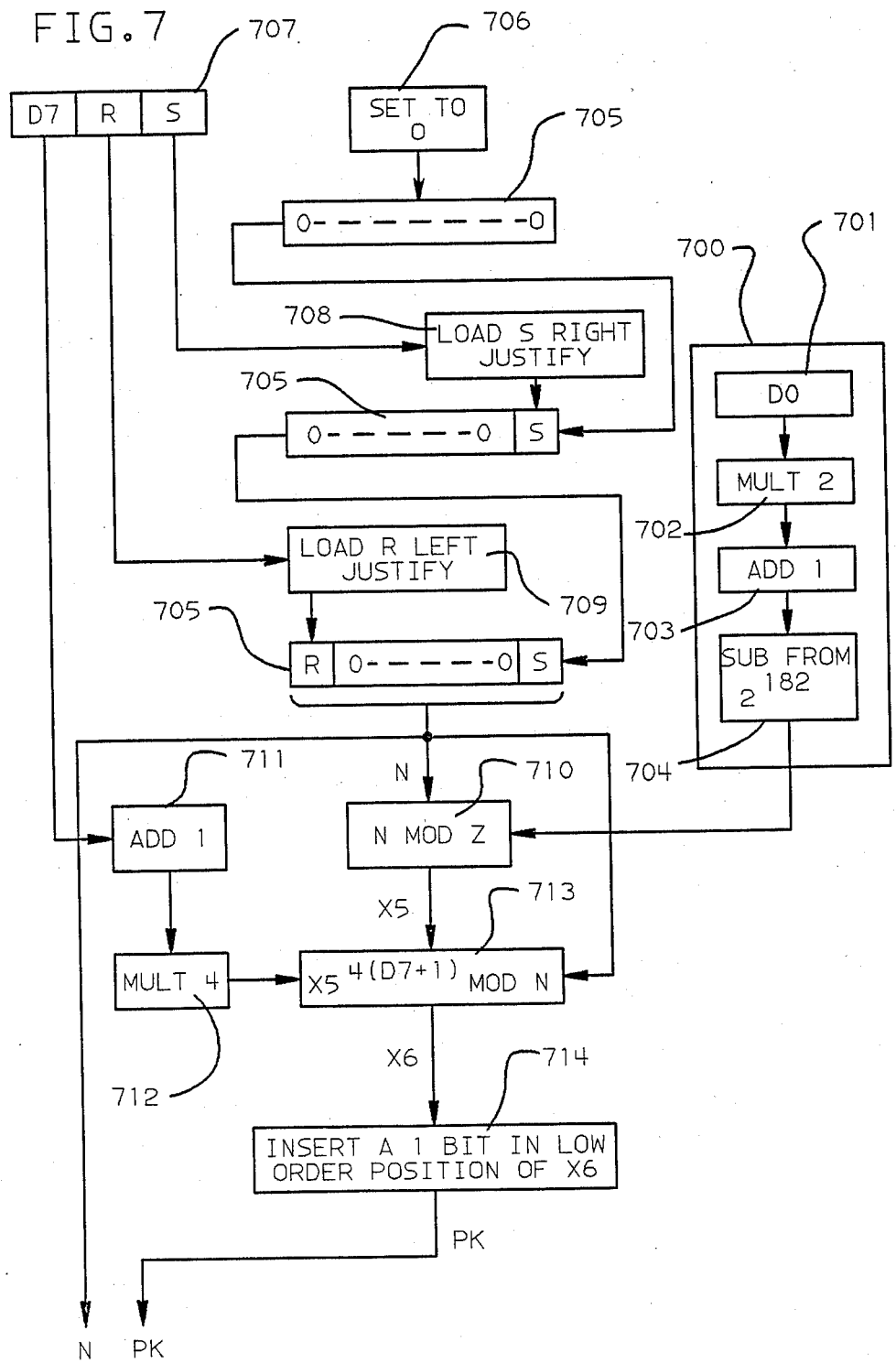

TECHNIQUE FOR REDUCING RSA CRYPTO VARIABLE STORAGE

This is a continuation-in-part of U.S. application Ser. No. 728,717 filed Apr. 30, 1985, now abandoned.

TECHNICAL FIELD

The present invention generally relates to encryption techniques for code stored on magnetic stripe cards and, more particularly, to techniques for reducing RSA (Rivest, Shamir and Adleman algorithm) crypto variable storage size so that the RSA algorithm is compatible with magnetic stripe cards.

PRIOR ART

Public-key encryption algorithms are growing rapidly in popularity and use. The concept of a public-key algorithm was first introduced by Diffie and Hellman in their paper, "New Directions in Cryptography," *IEEE Transactions on Information Theory*, IT-22, No. 6, pages 644 to 654 (1976). Diffie and Hellman proposed a public-key distribution system based on a specific mathematical transformation, called exponentiation, that is difficult to reverse; i.e., it is easy to raise a number to a power but difficult to perform the inverse operation of computing the logarithm. The system allows users to perform easy exponentiation, trade their results, and perform another exponentiation to produce identical keys. The transformation is a one-way function and, therefore, cannot be used for encipherment and decipherment of data.

In U.S. Pat. No. 4,218,582, Hellman and Merkle reference another paper by Diffie and Hellman entitled "Multiuser Cryptographic Techniques", *Proceedings 1976 National Computer Conference*, New York, pages 109 to 112, June 7–10, 1976, wherein the concept of a public key cryptosystem that would eliminate the need for a secure channel by making the sender's keying information public is proposed. The Hellman and Merkle patent builds on that concept and discloses a cryptographic system which transmits a computationally secure cryptogram that is generated from a publicly known transformation of the message sent by the transmitter. The publicly known transformation uses operations that are easily performed but extremely difficult to invert.

Rivest, Shamir and Adleman in their paper, "A Method for Obtaining Digital Signatures and Public-Key Cryptosystems," *Communications of the ACM*, 21, no. 2, pages 120 to 126 (1978), present an encryption method with the property that publicly revealing an encryption key does not thereby reveal the corresponding decryption key. This has two important consequences: (1) couriers and other secure means are not needed to transmit public keys, and (2) a message can be "signed" using a privately held decryption key and anyone can verify this signature using the corresponding publicly revealed encryption key. U.S. Pat. No. 4,405,829 to Rivest, Shamir and Adleman discloses a cryptographic communications system in which a message to be transferred is enciphered to ciphertext at the encoding terminal by first encoding the message as a number M in a predetermined set, and then raising that number to a first predetermined power (associated with the intended receiver) and finally computing the remainder, or residue, C, when the exponentiated number is divided by the product of two predetermined prime numbers (associated with the intended receiver). The residue C is the cipher text and is deciphered to the original message at the decoding terminal in a similar manner by raising the ciphertext to a second predetermined power (associated with the intended receiver), and then computing the residue, M', when the exponentiated ciphertext is divided by the product of two predetermined prime numbers associated with the intended receiver. The residue M' corresponds to the original encoded message M. The only known method for an outsider to break the code is to factor the product contained in the public key so as to extract the original two prime numbers that are the source of the decoding key which, at present, is computationally infeasible.

U.S. Pat. No. 4,351,982 to Miller et al. reviews the development of the public-key algorithms but recognizes that their use had been restricted to large computers because of the size of the prime numbers that are needed to be generated in order to ensure the security of the system. To overcome this problem, Miller et al. disclose a public key encryption system employing the RSA algorithm in which a subscriber, having only a microprocessor can come online in a relatively short period of time by generating the required prime numbers in a few hours. This is accomplished by the use of a GCD (greatest common divisor) routine which eliminates composite numbers without exponentiation and a unique method of forming a sequence of primes.

The application of public key algorithms to card based authentication systems has been limited. Mueller-Schloer in U.S. Pat. No. 4,438,824 discloses a cryptographic identity verification system which uses a data card. In this system, a plurality of terminals and a security service station are connected by a communication system. Each terminal has a central processing unit (CPU) including a memory and a card reader and a crypto module. The crypto module encrypts and decrypts data received from memory under the control of the CPU. The security service station also contains a CPU and a crypto module and a comparator for comparing personal identification information with reference personal identification information. The system uses personal feature extraction (or personal identification number entries) and verification (for instance, finger prints or voice) in conjunction with cryptographic principles. Both symmetrical data encryption standard (DES) cryptosystems and nonsymmetrical public key cryptosystems such as the RSA algorithm can be applied to the Mueller-Schloer identity verification system.

The Mueller-Schloer system is not, however, commercially acceptable in electronic funds transfer (EFT) or point of sale (POS) systems. Such systems typically employ magnetic stripe cards which carry a limited amount of encoded data that is used in conjunction with a user input personal identification number (PIN) to authenticate the user. Recently, attempts have been made to provide more security for EFT/POS systems. One such attempt is disclosed in U.S. Pat. No. 4,408,203 to Campbell. In Campbell's EFT system, encrypting of a secret code is carried out in accordance with an algorithm which makes use of an encrypting key. Specifically, Campbell uses the National Bureau of Standards (NBS) algorithm which is designed to encipher and decipher blocks of data consisting of 64 bits under the control of a 64-bit key. In the Campbell system, a security module is used to decrypt the code entered by a user and compare it to the corresponding encrypted code stored in a data processing unit.

Another example of a card based EFT system is disclosed in U.S. Pat. No. 4,423,287 to Zeidler. In this system, a one time session key is encrypted with master keys and sent along with specific segments of the request and response messages. Neither Campbell nor Zeidler use a public key algorithm. The principle problem with using a public key algorithm such as the RSA algorithm in an EFT/POS system is the limitation on the amount of data that can be stored on a magnetic stripe card.

In order to use the RSA algorithm in a secure way, its parameter sizes (key length and modulus length) must be set large enough so that it is computationally infeasible to factor the modulus into its prime factors. The most efficient factoring algorithm known today suggests that the keys and modulus must be 400 bits to maintain equivalency with the data encryption standard (DES). However, the magnetic stripe cards currently used in banking applications are incapable of storing the very large crypto variables necessary with the RSA algorithm. For example, the three tracks on the magnetic stripe of a bank card contain storage for 79, 40 and 108 characters, respectively. Each character consists of 4 bits, thus providing storage for 316, 160 and 432 bits, respectively. But current standards call for only decimal values 0 through 9 to be stored in each 4-bit character so that, effectively, each track can store only 79, 40 and 108 decimal digits, respectively. By comparison, a 400-bit number is equivalent to 120 decimal digits. Thus, it is fairly obvious that the 400-bit RSA crypto variables cannot be conveniently stored on the bank card. To be specific, the 400-bit secret key $SK_i$ and 400-bit modulus $N_i$ to be stored on a bank card would require a total of 240 decimal digits, but the card will only hold a maximum of 227 decimal digits, provided that the entire card could be dedicated to the storage of these two parameters.

In order for the RSA algorithm to be workable in banking applications, either a new magnetic stripe card with more storage must be developed or a more efficient way to store the secret key and modulus on the present magnetic stripe card must be found. Being incompatible with present magnetic stripe cards is a major disadvantage that would most likely impede the acceptance of public key algorithms. Applications involving personal keys (an especially important feature of public key cryptography) will thus be negatively impacted unless efficient techniques for storing parameters on the magnetic stripe card can be found or present card storage capabilities are extended.

SUMMARY OF THE INVENTION

It is therefore an object of the present invention to provide a technique for efficiently storing parameters required for public key algorithms on a magnetic stripe card.

It is a more specific object of this invention to provide a technique for storing RSA crypto variables on current magnetic stripe cards.

It is another object of the invention to adapt the RSA public key algorithm to EFT systems using magnetic stripe cards.

According to one aspect of the invention, a technique is provided for reducing RSA crypto variable storage from 1200 bits (400-bit public key, 400-bit secret key, and 400-bit modulus) to 106 bits. Of the 106 bits, only 56 bits (denoted X) must be kept secret. The size of X has thus been chosen to maintain equivalence with the DES. The remaining 50 bits are nonsecret. These 106 bits are used to derive two 200-bit primes P and Q (from which is computed the modulus $N=PQ$) and two 400-bit keys PK and SK. In effect, a savings in storage is achieved at the expense of performing a precomputation to derive the modulus and keys.

According to another aspect of the invention, there is provided a technique for reducing RSA crypto variable storage of the public key and modulus from 800 bits to 260 bits. These 260 bits can be used at any later time to derive the 400-bit public key PK and 400-bit modulus $N=PQ$. It will be appreciated, however, that the method of the invention can be applied to RSA cryptovariables of any size; e.g., 800 bits or 1200 bits instead of 400 bits.

BRIEF DESCRIPTION OF THE DRAWINGS

The foregoing and other objects, aspects and advantages of the invention will be better understood from the following detailed description of the invention with reference to the drawings, in which:

FIG. 5 is a block and flow diagram showing the cryptovariable generation process;

FIGS. 6A, 6B and 6C, taken together, are a block and flow diagram showing the precomputation one process; and FIG. 7 is a block and flow diagram showing the precomputation two process.

DETAILED DESCRIPTION OF A PREFERRED EMBODIMENT OF THE INVENTION

The invention provides personal verification and message authentication based on the RSA public key cryptosystem in an electronic funds transfer or point of sale system. Electronic funds transfer (EFT) is the name given to a system of directly debiting and crediting customer and service suppliers' accounts. The accounts are held at the bank which is connected to a network of retailers or service suppliers' data processing equipment. Point of sale (POS) is the name given to retailers' data processing systems in which check-out or sale point cash registers are connected to a data processing system. Such a system provides the consumer with an electronic method of making credit purchases.

Consider a network configuration of interconnected computers and connected terminals. The entry point at which financial transaction requests are initiated, such as a POS terminal or automated teller machine (ATM), is defined as an EFT terminal. An institution's computer facility, which manages the connected EFT terminals is referred to as a host processing center (HPC). Several HPCs can be interconnected via an "intelligent" switch. The switch, which can be another HPC, establishes connections between HPCs.

Users are normally provided with an embossed, magnetic stripe identification card or bank card containing, among other things, a primary account number (PAN). The institution at which the customer opens his account and which provides the user's bank card is referred to as the issuer. At an entry point to the system, information on the user's bank card is read into the system and the user enters a secret quantity called the personal identification number (PIN) to prove his claimed identity (PAN). If the cardholder has supplied the correct PIN and if the balance in the account if sufficient to permit the transaction, the system authorizes the funds transfer.

Figure 1:
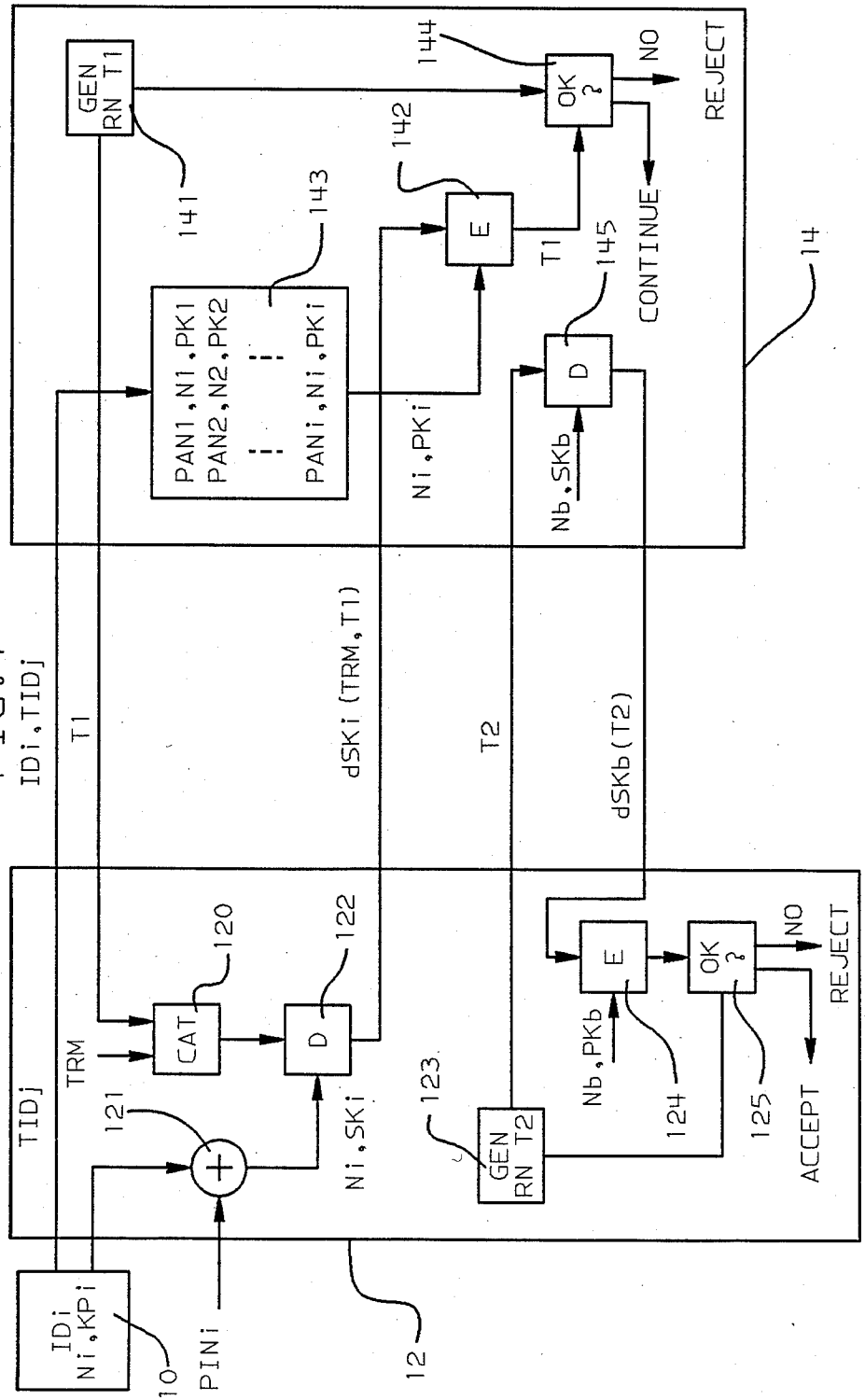
FIG. 1 is a block and flow diagram illustrating the use of an RSA cryptosystem to authenticate users in an electronic funds transfer or point of sale (EFT/POS) system.

A PIN entered into the system is normally protected via cryptography. The encryption algorithm assumed here is the Rivest, Shamir and Adleman public key algorithm based on modular exponentiation. Personal authentication is also based on a secret key stored on the bank card, which is referred to as a Personal Key (KP). FIG. 1 illustrates the use of an RSA cryptosystem to authenticate users in an EFT/POS system. For the purposes of the present discussion, it will be assumed that the card 10 has sufficient storage capacity to store the RSA crypto variables. As will be explained in the discussion following, the number of bits required to store the RSA crypto variables have been reduced to fit on the magnetic stripe card 10 and an expansion technique is used to regenerate the RSA crypto variables. As shown in FIG. 1, a transaction initiated by the user i consists of the following steps:

First, IDi (identification of the ith user), KPi (personal key of the ith user) and Ni (ith user's public modulus) on the bank card are read into the EFT terminal 12 and PINi (ith user's personal identification number) is entered via a PIN pad into the EFT terminal. IDi and TIDj (the identifier of the jth terminal) are sent to the HPC 14 in the first message.

Next, the HPC 14 responds by generating a random number T1 in random number generator 141 which is sent to the EFT terminal 12 in a second message. At the terminal, the random number T1 is concatenated with TRM at block 120, where TRM represents the transaction request message, and KPi and PINi are Exclusive ORed in Exclusive OR gate 121 to form the secret key, SKi. The secret key SKi is then used together with the public modulus Ni to decipher the message TRM,T1 in decryptor module 122 to produce dSKi(TRM,T1). The EFT terminal 12 responds by generating its own random number, T2, in random number generator 123 and sends dSKi(TRM,T1) and T2 to HPC 14 in the third message.

At HPC 14, dSKi(TRM,T1) is enciphered in block 142 with the public key and modulus of user i, which are obtained from key table 143 using IDi and TIDj, to recover TRM,T1 in clear form. The recovered random number T1 is then compared in comparator 144 for equality with the original random number T1 generated and saved by HPC 14. If the comparison is favorable, the received value of random number T2 is deciphered under the secret bank key and modulus, SKb and Nb, in decryptor module 145 to produce dSKb(T2), which is then sent to the EFT terminal 12 in a fourth message. Otherwise, the transaction request is rejected.

At the EFT terminal 12, the received value of dSKb(T2) is enciphered in encryptor module 124 with the public bank key and modulus, PKb and Nb, to recover random number T2 in clear form. The recovered random number T2 is then compared in comparator 125 for equality with the original random number T2 generated and saved at EFT terminal 12. If the comparison is favorable, the EFT terminal 12 accepts user i as valid; otherwise, user i is rejected.

The procedure just described is hypothetical since it is based on the assumption that the card 10 has sufficient storage capacity to store the RSA crypto variables. However, current magnetic stripe cards do not have sufficient storage capacity. According to the preferred embodiment of the subject invention, Ni and KPi on the card 10 are replaced with 106 bits and these are expanded to regenerate Ni and KPi by a technique which will now be described. Thus, the invention makes practical the procedure described with respect to the authenticating transaction in FIG. 1 by making current magnetic stripe cards usable with the RSA public key algorithm.

In many applications involving an RSA public key cryptosystem, it is likely that it will be necessary to distribute public keys and moduli of systems' users to other systems' users. For example, one user may wish to communicate with another user by encrypting data under the public key and modulus of that other user, or he may wish to be able to authenticate messages received from another user. This requires that he first obtain the public key and modulus of that other user from a designated key distribution center (KDC). Typically, the key distribution center would assure the integrity of transmitted crypto variables by deciphering them with its secret key and modulus prior to transmission. It may be assumed that each user has a copy of the corresponding public key and modulus belonging to the key distribution center. This can be assured, for example, by placing the public key and modulus in a public registry or publishing them in a newspaper such as the *Wall Street Journal* or other widely distributed publication. The public key and modulus of the key distribution center can then be used by each user of the system to recover crypto variables distributed by the key distribution center. This is accomplished by enciphering the deciphered crypto variables using the public key and modulus of the key distribution center. Although an adversary could substitute encrypted crypto variables, he could not cause a key and modulus (selected by the adversary) to be used by the receiver.

There is a problem with deciphering these public keys and moduli whenever the public key or modulus of the user is greater in value than the public modulus of the key distribution center. In such a case, the particular crypto variable must be divided and decrypted as two blocks instead of one. This makes the key distribution architecture more complex and requires additional unnecessary data to be transmitted. The present invention overcomes this problem by a method that allows the public key and modulus (amounting to 800 bits) to be regenerated from only 260 bits of public information. Thus, by decrypting these 260 bits, no more than 400 bits of data will be produced that require transmission. This is the minimum that must be transmitted and represents the best that could be done under any conditions. However, since 260 bits must be padded with roughly 140 bits to form a full block before decryption with the secret key and public modulus of the key distribution center can be performed, there are, in effect, 140 extra bits available that can be used very effectively to enhance the security of the distribution protocol at no extra penalty in terms of the number of transmitted bits. For example, these bits could include 56 redundant zero bits to allow the block of recovered data to be properly authenticated, a time-variant parameter or sequence number to allow the receiver to test that the crypto variable is not stale and is received in proper sequence, and an ID of the user to whom the public key and modulus belongs to insure that the crypto variables belong to the user for whom the request is being made.

Figure 2:
FIG. 2 is a block diagram showing the format for key distribution with the key expansion algorithm.

FIG. 2 illustrates the general format for transmitting a public key and modulus from the key distribution center to a user who has requested the same. It is assumed that the public modulus of the KDC is 400 bits and has a high order 1 bit. This is automatically guaranteed by the procedure of key generation which is part of the subject invention. As shown in FIG. 2, the high-order bits of the block, which are redundancy bits used to authenticate the block, are set to an agreed upon constant with the highest order bit forced to zero. For example, the agreed upon constant can be all zero bits as illustrated in FIG. 2. Forcing the highest order bit to zero guarantees that the number representing the data in the block to be decrypted under the public key and modulus of the key distribution center is less than the number representing the modulus, which in turn ensures that decryption can always be performed properly. The public key and modulus of the user whose identifier=ID is regenerated from the data in the field denoted NONSECRET CRYPTO VARIABLE.

Actually, the key distribution protocol described above in which redundant zero bits, sequence number and user ID are included in the message that transmits a public key and modulus from the key distribution center to a requesting user is something that would very likely be done regardless of whether a key expansion algorithm is employed or not. Without a key expansion algorithm, this automatically means that more than two blocks of data must be transmitted in order to forward a public key and modulus to a requesting user. In that case, one might try to minimize the number of transmitted bits by employing a method of chaining to encrypt the data comprising the message to be transmitted. However, with a key expansion algorithm, the electronic codebook (ECB) mode of encryption can be used for key distribution, which simplifies the protocol.

The key expansion algorithm according to the invention should more properly be called a crypto variable expansion algorithm. This is so because the RSA algorithm employs a modulus in addition to two keys. The modulus is not properly a key but is nevertheless required in order to encrypt and decrypt with both the public and private keys. The concept of key expansion has already been described as part of the data encryption standard (DES) algorithm. The DES employs a key scheduling algorithm that produces 16 48-bit internal keys or sub-keys from the 56 key-bits in the 64-bit external key. So the key expansion algorithm produces 768 bits of internal key from the single 56-bit key supplied to the algorithm. In effect, the key expansion algorithm expands 56 bits into 768 bits.

The present invention makes use of two external crypto variables called EXTERNAL CRYPTO VARIABLE ONE and EXTERNAL CRYPTO VARIABLE TWO. External crypto variable one consists of a secret part and a nonsecret part. Actually, the nonsecret part of external crypto variable one consists of seven individual parameters used by the key expansion algorithm. How these individual parameters are used in the key expansion algorithm is unimportant to the present discussion. In the example where the modulus is 400 bits, the secret part contains 56 bits and the nonsecret part 50 bits. If the modulus were greater, then the secret part would remain constant at 56 bits but the nonsecret part would increase For example, an 800-bit modulus would require roughly 60 bits for its nonsecret part. Assuming a 400-bit modulus, external crypto variable one (106 bits) is used with PRECOMPUTATION ONE to regenerate the secret key (400 bits) and the public modulus (400 bits). Actually, it will also regenerate the 400-bit public key, although that capability does not seem to be an advantage with respect to the applications outlined above.

Figure 3:
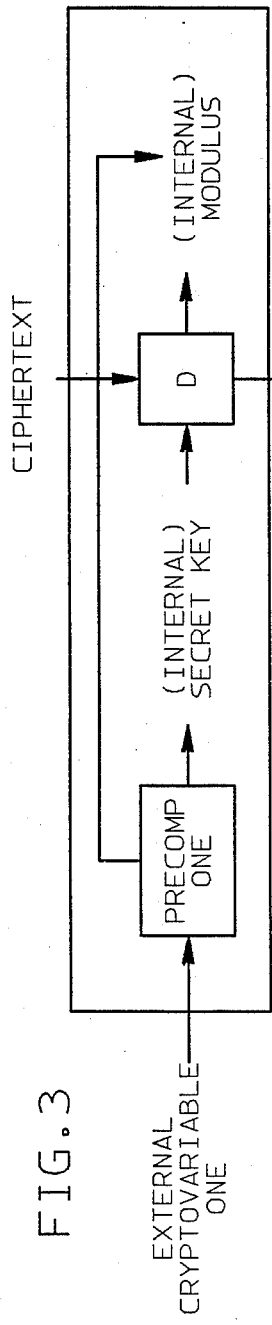
FIG. 3 is a block diagram showing the process of key expansion in the RSA algorithm prior to decrypting data with the secret key and public modulus.

FIG. 3 illustrates the process of key expansion in the RSA algorithm prior to decrypting data with the secret key and public modulus. Thus, external crypto variable one is subjected to precomputation one to generate the internal secret key and the internal modulus. The internal secret key and internal modulus are then used to decrypt the ciphertext and produce the plain text.

External crypto variable two is a nonsecret variable. Actually, it consists of three individual parameters. In the example where the modulus is 400 bits, this variable is 260 bits. If the modulus were greater than 400 bits, this parameter would also be greater. For example, an 800-bit modulus would require roughly 470 bits for external crypto variable two. Assuming a 400-bit modulus, external crypto variable two (260 bits) is used with PRECOMPUTATION TWO to regenerate the public key (400 bits) and public modulus (400 bits). It is computationally infeasible to derive the secret key from external crypto variable two.

Figure 4:
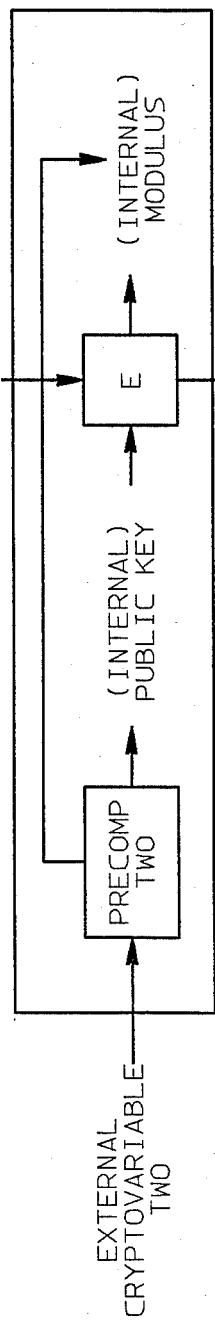
FIG. 4 is a block diagram showing the process of key expansion in the RSA algorithm prior to encrypting data with the public key and public modulus.

FIG. 4 illustrates the process of key expansion in the RSA algorithm prior to encrypting data with the public key and public modulus. Thus, external crypto variable two is subjected to precomputation two to produce the internal public key and the internal modulus. The internal public key and internal modulus are then used to encrypt the plaintext to product the ciphertext.

FIG. 5 illustrates the process of crypto variable generation. The process is one of trial and error. A 56-bit random number is generated and defined as a trial value of external secret crypto variable X. During the crypto variable generation step, the value X is used to derive values D1, . . . , D7, R and S. If successful, the derived values define external crypto variables one and two; otherwise, another trial value of X is selected and the process repeats until appropriate values are found. Since the procedure for generating X, D1, . . . , D7 traces closely the PRECOMPUTATION ONE procedure, the procedure for generating these variables is best described by first describing the PRECOMPUTATION ONE procedure. The procedure for generating R and S is more straightforward, and involves only four simple computational steps using values of P, D4, D5, and D6 produced as part of the procedure for generating X, D1, . . . , D7.

Consider now the process of PRECOMPUTATION ONE. Suppose we want b-bit primes P and Q, a 2b-bit modulus N, parameters D1, . . . , D6, with i bits, and parameter D7 with i+1 bits. Ordinarily, i≦10 for b≦400. The values of $2^{b-2(i+2)}$, $2^{b-2(i+2)-1}$, $2^{2b-3(i+2)}$, j, and D0, which depend on b or i, or both, are precalculated once b and i have been specified, and are stored and become an integral part of the PRECOMPUTATION ONE algorithm. Optionally, these values could be supplied to the precomputation algorithm as parameters. In particular, the values $2^{b-2(i+2)}$, $2^{b-2(i+2)-1}$ and $2^{2b-3(i+2)}$ in binary are just a 1 bit followed by an appropriate number of 0 bits, thus allowing them to be stored in a compressed format and reconstructed as needed. The value j is calculated using the equation $$j = 2^{k+4} - 1 \qquad (1)$$

where k is the smallest positive integer such that $2^{k-1}56 > b$. The constant D0, which is the smallest positive integer such that $$Z = 2^{b-2(i+2)} - (2D0 + 1)$$

is a prime number, is calculated iteratively by selecting trial values of D0=0, 1, 2, ... etc. until a value D0 is found such that Z is a prime number. Large numbers can be tested for primality in a variety of ways as discussed later under the discussion of crypto variable generation. A general form of the PRECOMPUTATION ONE calculation, where values for b and i are left as variables, is defined as follows:

1. Calc Z:   $Z = 2^{b-2(i+2)} - (2D0 + 1)$
2. Calc X1:  $X1 = X^j \bmod Z$
3. Calc X2:  $X2 = X1^{(D1+1)} \bmod Z$
4. Calc P'': $P'' = X2 \text{ OR } (2^{b-2(i+2)-1} + 1)$
5. Calc P':  $P' = 2(D2 + 2^i)P'' + 1$
6. Calc P:   $P = 2(D3 + 2^i)P' + 1$
7. Calc X3:  $X3 = \text{quotient of } 2^{2b-3(i+2)}/P$
8. Calc X4:  $X4 = X3 + 2 \text{ if } X3 \text{ odd};$
             $\quad = X3 + 1 \text{ if } X3 \text{ even}$
9. Calc Q'': $Q'' = 2(D4 + 2^i)X4 + 1$
10. Calc Q': $Q' = 2(D5 + 2^i)Q'' + 1$
11. Calc Q:  $Q = 2(D6 + 2^i)Q' + 1$
12. Calc N:  $N = PQ$
13. Calc X5: $X5 = N \bmod Z$
14. Calc X6: $X6 = X5^{4(D7+1)} \bmod N$
15. Calc PK: $PK = X6 \text{ if } X6 \text{ odd};$
             $\quad = X6 + 1 \text{ if } X6 \text{ even}$
16. Calc SK: $PK \times SK = 1 \bmod [1 \text{ cm}(P-1)(Q-1)]$ In an actual implementation of the described technique for reducing RSA crypto variable storage, the parameters b and i would most likely be fixed by that implementation. Therefore, to make the description of the precomputation procedures easier to comprehend and follow, consider the case where b=200; i.e., 200-bit primes and a 400-bit modulus are specified. Let i=7; i.e., parameters D1, ..., D6 have 7 bits, and parameter D7 has 8 bits. For a value of b=200, a D0 of 8 bits or less can very probably be found. It can be shown, for example, that the probability of finding an 8-bit value of D0 which produces a prime number Z according to this calculation is 0.9827. Thus, a value Z of b−2(i+2) bits can easily be recalculated from a D0 of relatively fewer bits, 7 or 8 bits, and only these relatively fewer bits need to be stored as part of the PRECOMPUTATION ONE algorithm. For a value of b=200, Equation (1) also gives a value of j=127 which is also easily stored as part of the algorithm.

Figure 6B:
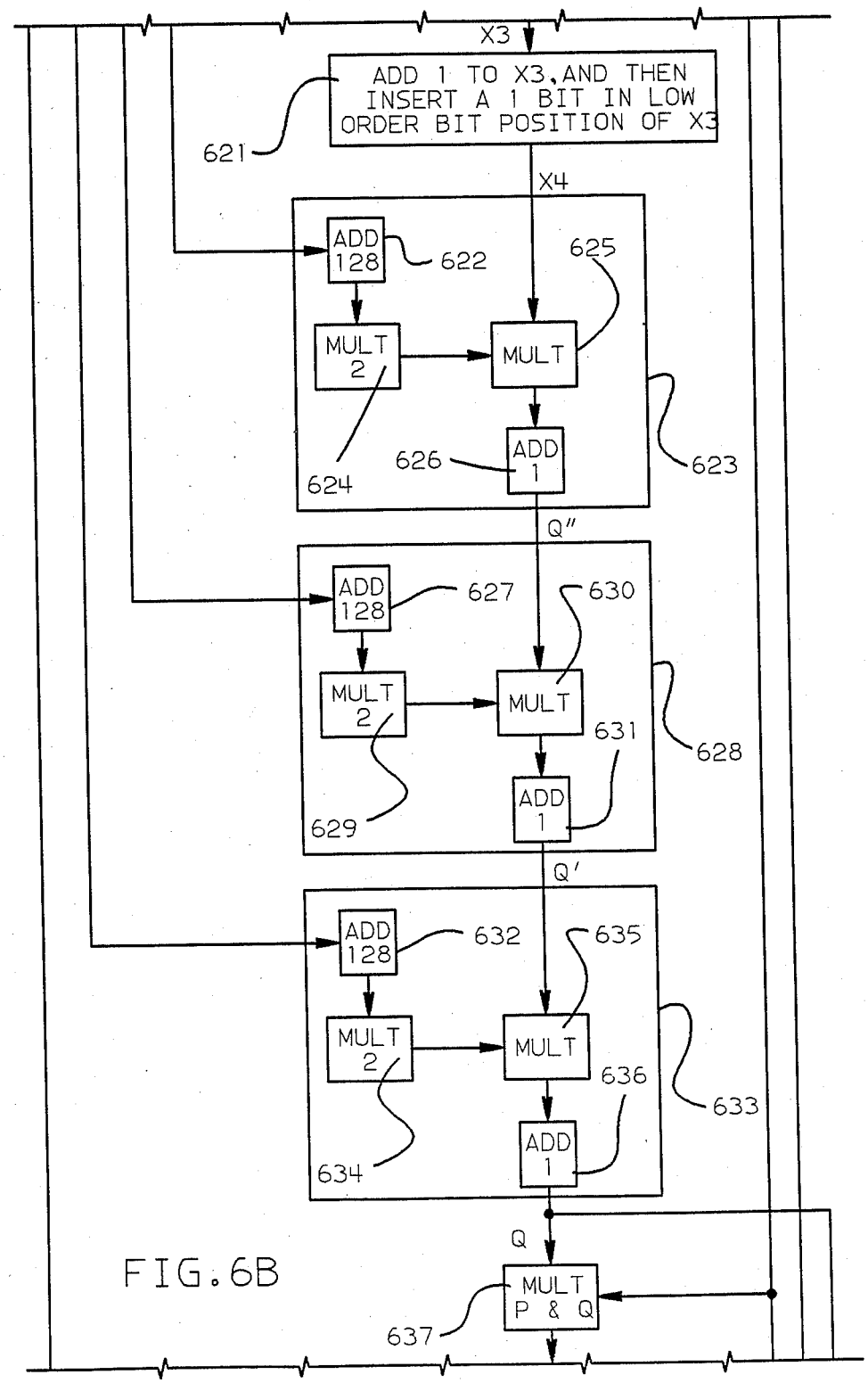

The PRECOMPUTATION ONE calculation for b=200 and i=7 is illustrated in FIGS. 6A, 6B and 6C and could be implemented with pipelined and paralleled processors. First, the calculation of Z is performed in calculation block 600 wherein the value of D0 stored in register 601 is multiplied by 2 as indicated in block 602 by shifting one place to the left, then adding one by forcing the least significant bit (LSB) to "1" as indicated in block 603, and then subtracting the result from $2^{182}$ in subtractor 604. Thus, by storing only D0 which contains relatively few bits, the 182-bit prime number Z can be easily recalculated.

Next, the 56-bit secret random number X is read from register 605 and exponentiated to the 127th power, and using the value of Z calculated in block 600, X1 is calculated using modulo arithmetic in calculation block 606. This involves six squaring and modulo operations which is more than enough to expand the 56-bit number X into a 182-bit number.

D1 is then read from register 605, and a "1" is added to this 7-bit number in adder 607. X1 calculated in block 606 is exponentiated by D1+1 and X2 is calculated in block 608 using modulo arithmetic and the value of Z calculated in block 600. The calculated value of X2 from block 608 is ORed with $2^{181}+1$ to produce prime number P'' in block 609. The calculation of P'' guarantees that P'' has a high-order "1" bit (i.e., that a 182-bit number is produced) and that P'' has a low-order "1" bit (i.e., that P'' is an odd number). Note that the ORing operation is just another way of saying that we set the high-order and low-order bits in P'' to "1".

Now, parameter D2 is read from register 605 and added to 128 in adder 610 in calculation block 611 and the result is multiplied by 2 by shifting one place to the left as indicated in block 612. The output from block 612 is multiplied in multiplier 613 with P'' calculated in block 609 and a "1" is added to the product in adder 614 to produce prime number P'. Next, parameter D3 is read from register 605 and added to 128 in adder 615 in calculation block 616 and the result is multiplied by 2 by shifting one place to the left as indicated in block 617. The output of block 617 is multiplied in multiplier 618 with P' calculated in block 611 and a "1" is added to the product in adder 619 to produce prime number P.

The prime number Q is produced in the next series of calculations. First, P calculated in block 616 is divided by $2^{373}$ to obtain the quotient X3 in block 620. Then, in block 621, 1 is added to X3 and the low order bit of X3 is forced to be a "1" to produce an odd number X4. Parameter D4 is read from register 605 and added to 128 in adder 622 in calculation block 623 and the result multiplied by 2 by shifting one place to the left as indicated by block 624. The output of block 624 is multiplied by X4 from block 621 in multiplier 625 and a "1" is added to the product in adder 626 to produce prime number Q''.

Next, the parameter D5 is read from register 605 and added to 128 in adder 627 in calculation block 628 and the result multiplied by 2 by shifting one place to the left as indicated in block 629. The output of block 629 is multiplied in multiplier 630 by Q'' calculated in block 623 and a "1" is added to the product in adder 631 to produce prime number Q'.

The process is repeated again by reading the parameter D6 from register 605 and adding it to 128 in adder 632 of calculation block 633 and multiplying the result by 2 by shifting one place to the left as indicated in block 634. The output of block 634 is multiplied in multiplier 635 by Q' calculated in block 628 and a "1" is added to the product in adder 636 to produce prime number Q.

As shown in FIGS. 6A, 6B and 6C, the next step in the process is the derivations of the public and secret keys PK and SK. First, the modulus N is calculated by multiplying P calculated in block 616 by Q calculated in block 633 in multiplier 637. The product N is used with Z calculated in block 600 to calculate X5 in block 638 using modulo arithmetic. The parameter D7 is now read from register 605 and a "1" is added to it in adder 639 and the result is multiplied by 4 by shifting twice to the left as indicated in block 640. Then, in block 641, X5 is exponentiated by the result from block 640 and used with N calculated in block 641 to calculate X6 using modulo arithmetic. In block 642, the low order bit of X6 is forced to a "1" to produce PK. "1's" are subtracted from P calculated in block 616 and from Q calculated in block 633 by subtractors 643 and 644, respectively. The outputs of subtractors 643 and 644 are multiplied in multiplier 645 and the product is supplied to calculation block 646 which also receives PK calculated in block 642. SK is determined in calculation block 646 as the number which satisfies the relationship wherein the product of PK and SK is equal to 1 mod ((P−1)(Q−1)).

The calculations performed for this specific example are summarized as follows:

1. Calc Z:     $Z = 2^{182} - (2D0 + 1)$
2. Calc X1:    $X1 = X^{127} \bmod Z$
3. Calc X2:    $X2 = X1^{(D1+1)} \bmod Z$
4. Calc P'':   $P'' = X2 \text{ OR } (2^{181} + 1)$
5. Calc P':    $P' = 2(D2 + 128)P'' + 1$
6. Calc P:     $P = 2(D3 + 128)P' + 1$
7. Calc X3:    $X3 = \text{quotient of } 2^{373}/P$
8. Calc X4:    $X4 = X3 + 2 \text{ if } X3 \text{ odd};$
               $= X3 + 1 \text{ if } X3 \text{ even}$
9. Calc Q'':   $Q'' = 2(D4 + 128)X4 + 1$
10. Calc Q':   $Q' = 2(D5 + 128)Q'' + 1$
11. Calc Q:    $Q = 2(D6 + 128)Q' + 1$
12. Calc N:    $N = PQ$
13. Calc X5:   $X5 = N \bmod Z$
14. Calc X6:   $X6 = X5^{4(D7+1)} \bmod N$
15. Calc PK:   $PK = X6 \text{ if } X6 \text{ odd};$
               $= X6 + 1 \text{ if } X6 \text{ even}$
16. Calc SK:   $PK \times SK = 1 \bmod [1 \text{ cm}(P - 1)(Q - 1)]$ Now that the PRECOMPUTATION ONE procedure has been described, the necessary modification to that procedure to allow for crypto variable generation, which again assumes values of b=200 and i=7, can be described. Since X is a number selected randomly, the object then is to discuss how the variables D1, ..., D7 are selected.

The generation process is based on the selection of a 56-bit number X at random and then trying to find the prime numbers P'', P', P, Q'', Q', and Q. At each stage, an arbitrary index from among the 128 possible is selected and no back-tracking is allowed; i.e., having selected the index leading to the prime number P'' and finding that no index will lead to a prime number P', a failure is declared and X is rejected. Thus, the process involves finding an index D1 that produces a prime P'', an index D2 that produces a prime P', and so forth, where the index values D1, ..., D6 correspond to the prime numbers P'', P', P, Q'', Q', and Q, in that order. It can be shown that for this example an average of 2.5 trial selections of a starting value of X (including the final successful trial) are required to produce the six prime numbers. One suitable technique for testing large numbers for primality is to use the efficient "probabilistic" algorithm described by R. Solovay and V. Strassen in their letter entitled "A Fast Monte-Carlo Test for Primality", *SIAM Journal on Computing*, March 1977, pages 84 and 85. It is obvious that increasing the number of bits in D1, ..., D6 from seven to perhaps eight or nine will increase the probability of finding the six prime numbers and thus reduce the average number of trial values of X required. In other words, there is a tradeoff that can be made between crypto variable generation computational time and the number of stored bits necessary to allow recovery of the prime numbers P and Q, where the product of P and Q is the modulus N. Similarly, D7 is found by arbitrarily selecting an index from among the 256 possible values such that a value of X6 is produced that in turn produces a public key PK which is relatively prime to the product of P−1 and Q−1. Two integers, a and b, are defined as being relatively prime if they contain no common prime factors. A simple procedure for testing relative primality of two numbers is well known in the art.

Referring now again to FIGS. 6A, 6B and 6C, a more precise description of the derivations of parameters D1, ..., D7 follows. The crypto variable generation procedure is the same as PRECOMPUTATION ONE except as noted below. First, a 56-bit value of X is randomly selected and stored in the location denoted X in block 605. A trial value of D1 is selected from among the 128 possible values 0, ..., 127. This value is stored in the location designated D1 in block 605 and is also input to block 607. The steps proceed as in the precomputation procedure to produce an output P'' from block 609. The criterion for P'' is that it pass the test for primality. If P'' is not a prime number, then it is necessary to iterate the calculations in blocks 607, 608 and 609 for a different trial value of the index D1 until a prime P'' is produced as an output from block 609 or until all possible index values have been exhausted and no prime P'' is found. This is accomplished by selecting a different value D1, storing this value in the location designated D1 in block 605, inputting the value to block 607, and repeating the precomputation steps of blocks 607, 608 and 609. If no prime P'' is found after exhausting all possible index values, then a new trial value of X is randomly selected and the process is repeated; i.e., D1 is found for the new X. If, however, a prime P'' is produced, then D1 in block 605 contains the index that produces a prime P'' from block 609. Thus, a value of D1 has been found, and the process continues.

A trial value of D2 is selected from among the 128 possible index values 0, ..., 127. This value is stored in the location designated D2 in block 605 and is also input to block 610. The steps proceed as in the precomputation to produce an output P' from block 614. The criterion for P' is that it pass the test for primality. If P' is not a prime number, then it is necessary to iterate the calculations of blocks 610, 612, 613, and 614 for a different trial value of the index D2 until a prime number P' is produced as an output from block 614 or until all possible index values have been exhausted and no prime P' is found. This is accomplished by selecting a different value of D2, storing this value in the location designated D2 in block 605, inputting the value to block 611, and repeating the precomputation steps of blocks 610, 612, 613, and 614. If no prime P' is found after exhausting all possible index values, then a new trial value of X is randomly selected and the process is repeated; i.e., new D1 and D2 are found for the new X. If, however, a prime P' is produced, the D2 in block 605 contains the index that produces a prime P' from block 614. Thus, values of D1 and D2 have been found, and the process continues.

A trial value of D3 is selected from among the 128 possible index values 0, ..., 127. This value is stored in the location designated D3 in block 605 and is also input to block 615. The steps proceed as in the precomputation procedure to produce an output P from block 619. The criterion for P is that it pass the test for primality. If P is not a prime number, then it is necessary to iterate the calculations in blocks 615, 617, 618, and 619 for a different trial value of the index D3 until a prime P is produced as an output from block 619 or until all possible index values have been exhausted and no prime P is found. This is accomplished by selecting a different value of D3, storing this value in the location designated D3 in block 605, inputting the value to block 615, and repeating the precomputation steps of blocks 615, 617, 618, and 619. If no prime P is found after exhausting all possible index values, then a new trial value of X is randomly selected and the process repeated; i.e., new D1, D2 and D3 are found for the new X. If, however, a prime P is produced, then D3 in block 605 contains the index that produces a prime P from block 619. Thus, values of D1, D2 and D3 have been found, and the process continues.

A trial value of D4 is selected from among the 128 possible index values 0, ..., 127. This value is stored in the location designated D4 in block 605 and is also input to block 622. The steps proceed as in the precomputation procedure to produce an output Q" from block 626. The criterion for Q" is that it pass the test for primality. If Q" is not a prime number, then it is necessary to iterate the calculations in blocks 622, 624, 625, and 626 for a different trial value of the index D4 until a prime Q" is produced as an output from block 626 or until all possible index values have been exhausted and no prime Q" is found. This is accomplished by selecting a different value of D4, storing this value in the location designated D4 in block 605, inputting the value to block 622, and repeating the precomputation steps of blocks 622, 624, 625, and 626. If no prime Q" is found after exhausting all possible index values, then a new trial value of X is randomly selected and the process is repeated; i.e., D1, D2, D3, and D4 are found for the new X. If, however, a prime Q" is produced, then D4 in block 605 contains the index that produces a prime Q" from block 626. Thus, values of D1, D2, D3, and D4 have been found, and the process continues.

A trial value of D5 is selected from among 128 possible index values 0, ..., 127. This value is stored in the location designated D5 in block 605 and is also input to block 627. The steps proceed as in the precomputation procedure to produce an output Q' from block 631. The criterion for Q' is that it pass the test of primality. If Q' is not a prime number, then it is necessary to iterate the calculations in blocks 627, 629, 630, and 631 for a different trial value of the index D5 until a prime Q' is produced as an output from block 631 or until all possible index values have been exhausted and no prime Q' is found. This is accomplished by selecting a different value of D5, storing this value in the location designated D5 in block 605, inputting the value to block 627, and repeating the precomputation steps of blocks 627, 629, 630, and 631. If no prime Q' is found after exhausting all possible index values, then a new trial value of X is randomly selected and the process is repeated; i.e., new D1, D2, D3, D4, and D5 are found for the new X. If, however, a prime Q' is produced, then D5 in block 605 contains the index that produces a prime Q' from block 631. Thus, values of D1, D2, D3, D4, and D5 have been found, and the process continues.

A trial value of D6 is selected from among the 128 possible index values 0, ..., 127. This value is stored in the location designated D6 in block 605 and is also input to block 632. The steps proceed as in the precomputation procedure to produce an output Q from block 636. The criterion for Q is that it pass the test for primality. If Q is not a prime number, then it is necessary to iterate the calculations in blocks 632, 634, 635, and 636 for a different trial value of the index D6 until a prime Q is produced as an output from block 636 or until all possible index values have been exhausted and no prime Q is found. This is accomplished by selecting a different value of D6, storing this value in the location designated D6 in block 605, inputting the value to block 632, and repeating the precomputation steps 632, 634, 635, and 636. If no prime Q is found after exhausting all possible index values, then a new trial value of X is randomly selected and the process is repeated; i.e., new D1, ..., D6 are found for the new X. If, however, a prime Q is produced, then D6 in block 605 contains the index that produces a prime Q from block 636. Thus, values D1, ..., D6 have been found, and the process continues.

A trial value of D7 is selected from among the 256 possible index values 0, ..., 255. This value is stored in the location designated D7 in block 605 and is also input to block 639. The steps proceed as in the precomputation procedure to produce an output PK from block 642. The criterion for PK is that it be relatively prime to the product of P−1 and Q−1 which is obtained as the output from block 645. If this condition is not satisfied, then it is necessary to iterate the calculations in blocks 639, 640, 641, and 642 for a different trial value of the index D7 until a PK relatively prime to the product of P−1 and Q−1 is produced as an output from block 642 or until all possible index values have been exhausted and no suitable PK is found. This is accomplished by selecting a different value of D7, storing this value in the location designated D7 in block 605, inputting the value to block 639, and repeating the precomputation steps of blocks 639, 640, 641, and 642. If no suitable PK is found after exhausting all possible index values, then a new value of X is randomly selected and the process is repeated; i.e., new D1, ..., D7 are found for the new X. If, however, a PK relatively prime to the product of P−1 and Q−1 is produced, then D7 in block 605 contains the index that produces a suitable PK from block 642. Thus, values D1, ..., D7 have been found, and the generation process is completed.

The quantities produced by the crypto variable generation procedure and required by the PRECOMPUTATION ONE procedure are summarized in Table 1.

TABLE 1

| Name | Secret/Nonsecret | Size | Method of Selection | Value |
|---|---|---|---|---|
| X | Secret | 56 Bits | Random | Mixture 0's & 1's |
| D1 | Nonsecret | 7 Bits | Derived | [0, 1, ..., 127] |
| D2 | Nonsecret | 7 Bits | Derived | [0, 1, ..., 127] |
| D3 | Nonsecret | 7 Bits | Derived | [0, 1, ..., 127] |
| D4 | Nonsecret | 7 Bits | Derived | [0, 1, ..., 127] |
| D5 | Nonsecret | 7 Bits | Derived | [0, 1, ..., 127] |
| D6 | Nonsecret | 7 Bits | Derived | [0, 1, ..., 127] |
| D7 | Nonsecret | 8 Bits | Derived | [0, 1, ..., 255] |

As can be seen, a total of 106 bits are required, from which the crypto variables N=PQ, PK and SK (a total of 1200 bits) can be regenerated. This, in itself, suggests some novel implementations based on a 56-bit secret number. For example, the 56-bit value X could double as a DES key in systems offering only DES encryption, whereas the 56-bit value plus the additional 50 bits of nonsecret data could be used to generate the RSA cryptovariables in systems where the RSA algorithm has been implemented. Thus, the described method has the advantage that it opens up the possibility that an RSA cryptosystem can be used for applications that would otherwise be excluded from consideration because of the algorithm's parameter sizes.

To further illustrate the precomputation process, assume that the parameters in Table 1 have been generated and written on a magnetic stripe card. The user carries the card and presents it to an EFT terminal as described with reference to FIG. 1. In addition to the normal encryption and decryption that takes place, each EFT terminal 12 is programmed with a procedure for computing the user's crypto variables (public key PK, secret key SK, and public modulus N=PQ) preliminary to performing encryption or decryption. The precomputation is the same as that used in the initial generation except that all quantities are computed directly, i.e. there is no trial and error involved as in the case of the crypto variable generation.

The variables R and S, which are used by the PRECOMPUTATION TWO procedure, are generated from the variables P, D4, D5, and D6 which themselves are produced as part of the procedure for generating the variables X, D1, . . . , D7 to be used by the PRECOMPUTATION ONE procedure. A general form of the calculation steps for producing R and S from P, D4, D5, and D6, where values for b and i are left as variables, is defined as follows:

1. Calc $X7$:    $X7 = 2^{2b-3(i+2)+3} \bmod P$
2. Calc $X8$:    $X8 = X7 - 2P$ if $X3$ odd
              $= X7 - P$ if $X3$ even
3. Calc $R$:    $R = (D4 + 2^i)(D5 + 2^i)(D6 + 2^i)$
4. Calc $S$:    $S = -8(X8)R +$
            $4P(D5 + 2^i)(D6 + 2^i) +$
            $2P(D6 + 2^i) +$
            $P$ As can be seen, the steps for generating R and S from P, D4, D5, and D6 involve no trial and error calculations as in the case of generating the values X, D1, . . . , D7. Instead, the calculations are straightforward and completely deterministic.

The steps for calculating R and S in the specific case where b=200 and i=7 are defined as follows:

1. Calc $X7$:    $X7 = 2^{373} \bmod P$
2. Calc $X8$:    $X8 = X7 - 2P$ if $X3$ odd
              $= X7 - P$ if $X3$ even
3. Calc $R$:    $R = (D4 + 128)(D5 + 128)(D6 + 128)$
4. Calc $S$:    $S = -8(X8)R +$
            $4P(D5 + 128)(D6 + 128) +$
            $2P(D6 + 128) +$
            $P$ Now that the procedure for generation of the variables R and S has been discussed, the PRECOMPUTATION TWO calculation is defined. The general form of the calculation steps for producing PK and N from R, S and D7, where b and i are left as variables and D0 is assumed to be a parameter of the procedure, is defined as follows:

1. Calc $Z$:    $Z = 2^{b-2(i+2)} - (2D0 + 1)$
2. Calc $N$:    $N = (2^{2b-3(i+2)+3}R) + S$
3. Calc $X5$:    $X5 = N \bmod Z$
4. Calc $X6$:    $X6 = X5^{4(D7+1)} \bmod N$
5. Calc $PK$:    $PK = X6$ if $X6$ odd;
              $= X6 + 1$ if $X6$ even The PRECOMPUTATION TWO procedure for calculating PK and N in the specific case where b=200 and i=7 is defined as follows:

1. Calc $Z$:    $Z = 2^{182} - (2D0 + 1)$
2. Calc $N$:    $N = (2^{376}R) + S$
3. Calc $X5$:    $X5 = N \bmod Z$
4. Calc $X6$:    $X6 = X5^{4(D7+1)} \bmod N$
5. Calc $PK$:    $PK = X6$ if $X6$ odd
              $X6 + 1$ if $X6$ even A preferred way of performing PRECOMPUTATION TWO, where S is guaranteed positive is illustrated in FIG. 7. First, the calculation of Z is performed in calculation block 700 wherein the value D0 stored in register 701 is multiplied by 2 as indicated in block 702 by shifting one place to the left, then adding one by forcing the least significant bit (LSB) to "1" as indicated in block 703, and then subtracting the result from $2^{182}$ in subtractor 704. Next, the 400-bit register 705 is preinitialized to all zero bits by circuit 706. The nonsecret value of S is then read from register 707 and loaded right justified into register 705 by circuit 708. The nonsecret value R is also read from register 707 and loaded left justified into register 705 by circuit 709. As a result of loading R and S into register 705, register 705 now contains from left to right a 24-bit value R, 148 zero bits, and a 228-bit value S. This, in effect, produces the value N in register 705.

The contents of register 705 are now used with Z calculated in block 700 to calculate X5 in block 710 using modulo arithmetic; i.e., X5 is the remainder obtained when the number in register 705 is divided by the value Z. The parameter D7 is then read from register 707 and a "1" is added to it in adder 711 and the result is multiplied by 4 by shifting twice to the left as indicated in block 712. Then, in block 713, X5 is exponentiated by the result from block 712 and used with the value N obtained from register 705 to calculate X6 using modulo arithmetic. In block 714, the low order bit of X6 is forced to a "1" to produce PK. Thus, the calculations produce the modulus N in register 705 and the public key PK as an output of block 714.

The technique for reducing cryptovariable storage may be summarized as follows. Precomputation one requires 106 bits of storage (56 secret bits and 50 nonsecret bits). PRECOMPUTATION TWO requires 260 bits of storage, and all 260 bits are nonsecret. About twice as much computation is required for cryptovariable generation. Either precomputation procedure, which is equivalent to less than 10% of one RSA encryption, is required each time the modulus and keys are regenerated from the stored bits.

In the PRECOMPUTATION TWO general form given, step 2, the calculation of X8, includes a "−2 p" term if X3 is odd and a "−p" term if X3 is even. This insures that X8 is a negative number so that in step 4, the calculation of "S" will always result in a positive quantity, "R" always being positive. Thus, in FIG. 7 the modulus N can be reconstructed from R and S by first loading all "0" bits in register 705, then loading and left justifying R in register 705 and then loading and right justifying S in register 705. Loading and right justifying S in register 705 is equivalent to adding S to register 705.

As a mathematical corollary to the definition of X8, in the general form of the PRECOMPUTATION ONE calculation and in the specific example thereof given above, in step 8, X4 is calculated as equal to X3+2 if X3 is odd. In FIG. 6B, this is carried into effect by adding "1" to X3 which will compliment the low order bit to "0" if X3 were odd, and then the additional step oil forcing the low order bit to a "1" will in such case add another unit to the sum, satisfying the first alternative of step 8. If X3 had been even, the step of forcing the low order bit to "1" after "1" has been added will have no effect and the net gain in value of X4 over X3 will be an addition of one unit as in the second alternative of step 8.

However it will be clear that variables X4 and X8 could have been defined so that cryptovariable S was forced to be a negative number in which case the modulus N would be reconstructed from R and S by loading register 705 with all zero bits, then loading and left justifying R in register 705 and then subtracting S from register 705. However, this is a less attractive solution than the simple concatenation operation by which the addition can be effected in register 705 when S is a positive number, as above discussed.

A somewhat more complicated situation results if PRECOMPUTATION ONE and PRECOMPUTATION TWO are defined such that S is sometimes positive and sometimes negative, in which case for practical purposes N is reconstructed by loading register 705 with all zero bits, then loading and left justifying R in register 705 and then either adding or subtracting S to/from register 705 depending on whether S is positive or negative, respectively. This would require a sign bit or its equivalent for S.

In summary, PRECOMPUTATION ONE to yield N and PK from D7, R and S can be carried most conveniently if S is always positive, somewhat less conveniently if S is always negative (complementing or other subtraction means being required to introduce the negative S quantity into register 705), and in some cases least conveniently of all where S is allowed to be either positive or negative since then the sign, not being predetermined, cannot be built into the hardware and must be carried by some separate indicator. In each case, however, the modulus N is found by adding S to the product of R and the system constant.

While the invention has been particularly shown and described with respect to a preferred embodiment thereof, it will be understood by those skilled in the art that the foregoing and other changes in form and details may be made therein without departing from the spirit and scope of the invention.

Having thus described my invention, what I claim as new, and desire to secure by Letters Patent is:

1. A method of personal identification for a user of a multiterminal system, said method being based on a public key cryptosystem of the modulo exponentiation type whose modulus is the product of two prime binary numbers and comprising the steps of:
    storing on a magnetic stripe card an account number assigned to the user and an external cryptovariable, said external cryptovariable comprising n bits of which m bits are kept secret and the remaining n-m bits are public;
    reading at a terminal of said multiterminal system the user's account number and said external cryptovariable;
    performing a computation on said external cryptovariable to regenerate a secret personal key and public modulus assigned to the user;
    receiving a secret personal identification number entered by the user at the terminal; and
    verifying the identification of the user based on the user's account number, the regenerated secret personal key and public modulus and the personal identification number entered by the user.

2. The method recited in claim 1 wherein the step of storing is performed by recording said external cryptovariable on said magnetic stripe card with no more than 106 bits.

3. The method recited in claim 1 wherein the step of storing is performed by recording said external cryptovariable on said magnetic stripe card with 106 bits of which 56 bits are kept secret, and wherein the step of performing a computation produces a secret key and public modulus of 400 bits each.

4. The method recited in claim 1 wherein the step of performing a fast precomputation comprises the steps of:
    expanding the bit size of said secret m bits according to a predefined nonsecret function using said public n-m bits to generate a first prime number;
    dividing a predetermined constant by said first prime number to obtain a quotient;
    expanding the bit size of said quotient according to a predefined nonsecret function using said public n-m bits to generate a second prime number;
    multiplying said first and second prime numbers together to obtain as a product said public modulus; and
    deriving from said first and second prime numbers said secret key.

5. In a public key cryptosystem of the modulo exponentiation type whose modulus is the product of two prime binary numbers P and Q, a method of generating at least one of the primes P and the modulus, comprising the steps of:
    supplying a secret x-bit first binary number X;
    supplying a nonsecret d-bit second binary number D;
    expanding the bit size of X according to a predefined nonsecret function using binary number D to generate said prime number P,
    dividing a predetermined constant by said prime number P to produce a quotient;
    expanding the bit size of said quotient according to a predefined nonsecret function using binary number D to generate said prime number Q; and
    multiplying said prime numbers P and Q together to produce a product which is said modulus.

6. The method recited in claim 5 further comprising the step of deriving a secret key from said prime numbers P and Q.

7. A method of transmitting a public key and modulus to a requesting user from a key distribution center, said public key and modulus being used in a public key cryptosystem of the modulo exponentiation type whose modulus is the product of two prime binary numbers, said method of transmitting comprising the steps of:
    providing a non-secret cryptovariable having a number of bits m less than the number of bits n of either of said public key and modulus;
    transmitting said cryptovariable together with a user identification and sequence number and a number of bits to pad the transmitted block to a total of n bits;
    expanding the received cryptovariable using a predefined nonsecret function to provide said public key and modulus, and
    wherein said step of providing said nonsecret cryptovariable is performed using a trial and error technique and n=400 bits and m=260 bits.

8. A method of transmitting a public key and modulus to a requesting user from a key distribution center, said public key and modulus being used in a public key cryptosystem of the modulo exponentiation type whose modulus is the product of two prime binary numbers, said method of transmitting comprising the steps of:

providing a non-secret cryptovariable having a number of bits m less than the number of bits n of either of said public key and modulus;

transmitting said cryptovariable together with a user identification and sequence number and a number of bits to pad the transmitted block to a total of n bits;

expanding the received cryptovariable using a predefined nonsecret function to provide said public key and modulus, and wherein said step of providing said nonsecret cryptovariable is performed by generating an n-bit modulus N as the function of $CR+S$ of a nonsecret r-bit first binary number R, a non-secret s-bit second binary number S, and a c-bit system constant C where $s < c + r$.

9. The method recited in claim 8 further comprising the steps of:

multiplying R by the c-bit system constant C to form a product; and adding S to said product to form N.

10. In public key cryptosystem of the modular exponentiation type, a method of generating an n-bit modulus N as the function $CR+S$ of a nonsecret r-bit first binary number R, a nonsecret s-bit second binary number S, and a c-bit system constant C, where $s < c + r$, said method comprising the steps of supplying the nonsecret r-bit first binary number R, supplying the nonsecret s-bit second binary number S, multiplying R by the c-bit system constant C, and adding S to the product RC to form N.

11. The method according to claim 10 wherein C has a high order 1 followed by all zeros, and the modulus N is generated by assembling the r bits of R, $n-(r+s)$ zero bits, and the s bits of S in that order.

12. In a public key cryptosystem of the modulo exponentiation type whose modulus is the product of two prime binary number P and Q, a method of generating a cryptovariable corresponding to at least one of the primes P in the modulus comprising the steps of:

arbitrarily choosing a secret x-bit first binary number X;

selecting a nonsecret d-bit binary number D which when used with a computation function produces a trial value for said prime number P;

testing said trial value for primality, and if the test for primality fails, selecting another nonsecret d-bit binary number until all possible values of D have been exhausted or said trial value passes the test for primality, but if all possible values of D have been exhausted and said trial value fails the test for primality, choosing a different X and repeating the steps of selecting and testing until said trial value passes the test for primality, dividing a predetermined constant by a trial value of P which has passed the test for primality to produce a quotient; and choosing said d-bit number D such that when used with said computation function to expand said quotient a second trial value for Q is produced; and testing said second trial value for primality, and if said second trial value fails the test for primality, choosing a different number D until all possible values of D are exhausted or said second trial value passes the test of primality, but if all possible values of D are exhausted, then selecting a new number X and repeating the steps of selecting the number D until both said first and second trial values pass the test of primality.

* * * * *